Patented Aug. 12, 1941

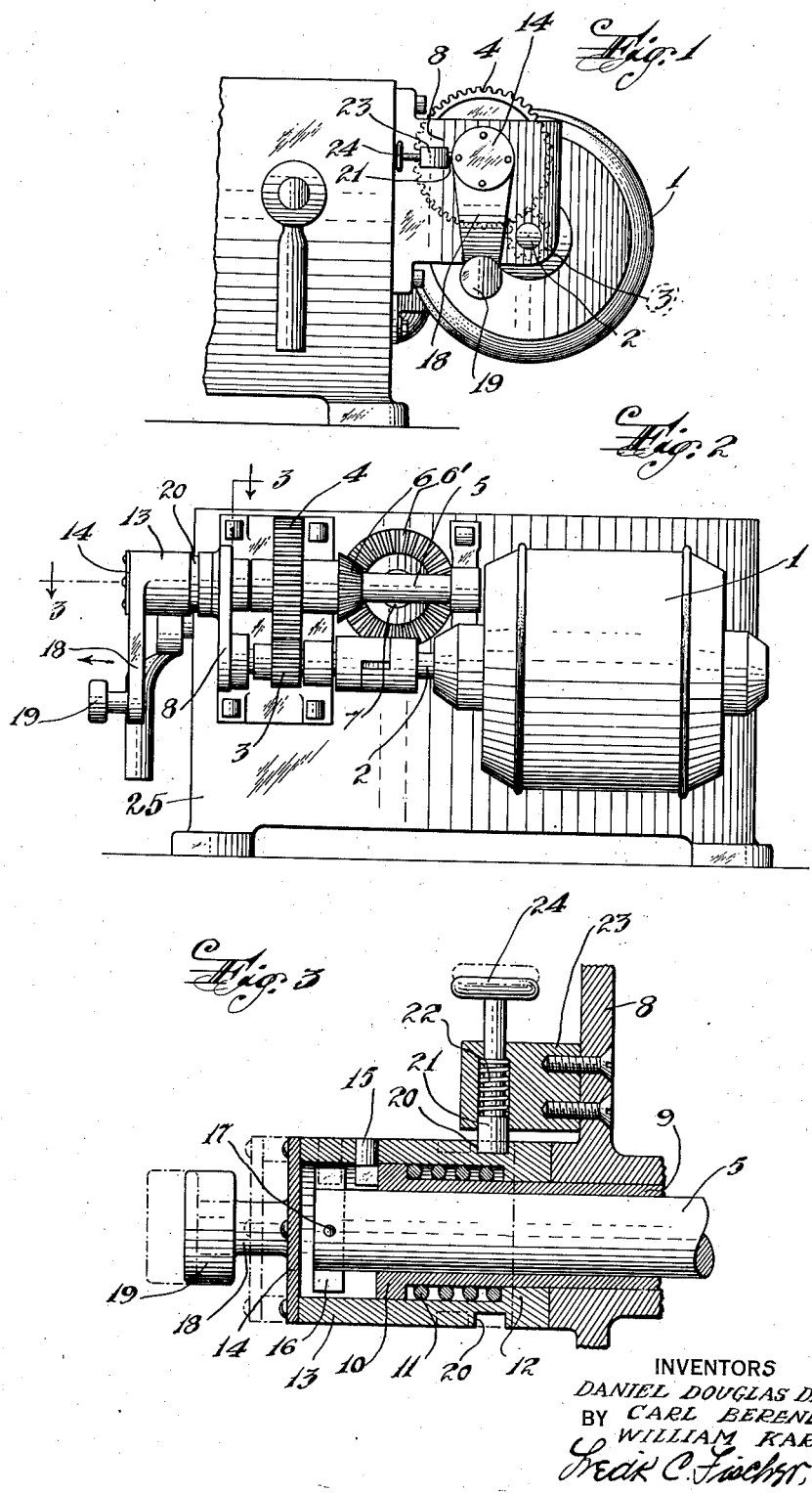

2,252,670

UNITED STATES PATENT OFFICE 2,252,670

DEVICE FOR MANUALLY ADJUSTING MACHINES

Daniel Douglas Demarest, Little Neck, N. Y., and Carl Berendt, East Orange, and William Karius, Irvington, N. J., assignors to Automatic Linker, Inc., Newark, N. J., a corporation of New York Application August 1, 1940, Serial No. 349,213

5 Claims. (Cl. 192—67)

This invention relates to devices for manually operating automatic machines for adjusting purposes.

The invention herein contemplated is especially adapted for machines for automatically linking sausages as described in application for U. S. Letters Patent, Serial No. 263,364, filed March 22, 1939 and issued as Patent No. 2,228,075 on January 7, 1941.

In such machines, manual adjustments are required from time to time. Heretofore, such manual adjustments have been made with appreciable difficulty and inconvenience, since the normal operation of the machine is by motor and the gearing arranged accordingly.

It is, therefore, an object of this invention to provide a device for manually adjusting a machine conveniently and rapidly without regard to the normal motor operation thereof.

A further object is the provision of a manual adjusting means for a machine which is normally held in an inoperative position when the machine is being driven by a motor.

These and other advantageous objects, which will later appear, are accomplished by the simple and practical construction and arrangement of parts hereinafter described and exhibited in the accompanying drawing, forming part hereof, and in which:

Fig. 1 is a front elevational view of a machine embodying the invention.

Fig. 2 is a side view of a machine embodying the invention, and

Fig. 3 is a sectional view taken on line 3—3 of Fig. 2, of a handle arrangement for manually operating a machine in accordance with the invention.

Referring to the drawing, there is shown an operating motor 1, having a shaft 2, to which is fixed a gear 3, in mesh with a gear 4 attached to the shaft 5, carrying a bevel gear 6 engaging a bevel gear 6' fixed to a shaft 7 at right angles to the shaft 5. The shaft 5 passes through a supporting plate 8, which is secured to a housing 25, and is journalled in a sleeve 9 having a flange 10 and encircled by a compression spring 11 which abuts the flange 10 and the shoulder 12 on a casing 13, in which the sleeve 9 and spring 11 are positioned. The outer end of casing 13 is provided with an end plate 14.

The end of shaft 5 has diametrically arranged therein a short bar 16 which is held in place by a pin 17. Integral with casing 13 and depending therefrom is a handle 18 having a knob 19.

Extending inwardly from the wall of casing 13 is a pin 15 adapted to engage the bar 16, and the wall of the casing 13 is also provided with a circumferential groove 20 receiving a plunger 21 encircled by a compression spring 22 mounted in a block 23, the plunger 21 having a handle 24, see Fig. 3.

In operation, the bevel gears 6 and 6' are driven by the motor 1 through gears 3 and 4. When it is desired to manually adjust the machine, the handle 24 is grasped to move the plunger 21 out of the circumferential groove 20 against the action of spring 22 to enable the casing 13 to be pulled outwardly against the action of compression spring 11 as indicated in dotted lines in Fig. 3. When the casing 13 is pulled outwardly, the pin 15 will engage the bar 16 to enable the shaft 5 to be rotated by the handle 18, 19. By this arrangement, the shaft 5 can be rotated to operate gears 6 and 6' to rotate shaft 7 and manually effect whatever adjustment may be necessary. As soon as the handle 18, 19 is released, casing 13 will be automatically returned to its normal inoperative position by the action of spring 11 and held in this position by the plunger 21 in the circumferential groove 20.

From the above description it will be seen that there has been provided a handle arrangement for adjusting manually an automatic machine, the handle and associated parts being so constructed and arranged that they will not interfere with the normal operation of the machine and are effective only when the handle is moved to a predetermined position and manually held in such a position during the manual adjusting operation.

In automatic sausage linking machines, due to the accidental bunching of sausage in the machine from time to time, it is necessary to stop the machine and manually readjust the various parts. Also, a manual adjustment is necessary in adjusting the machine to link sausages of different lengths. Consequently, the device herein disclosed is of considerable importance and convenience in a machine of the type considered.

The foregoing disclosure is to be regarded as descriptive and illustrative only, and not as restrictive or limitative of the invention, of which, obviously, many embodiments may be considered, including many modifications, without departing from the spirit and scope of the invention herein set forth and denoted in the appended claims.

Having thus described the invention, what is claimed as new and desired to be secured by Letters Patent, is:

1. In a device of the class described, a shaft, a sleeve in which said shaft is journalled, said sleeve having a flange at one end thereof, a rotatable and axially shiftable casing surrounding said sleeve and having a shoulder, a compression spring encircling the sleeve and abutting said flange and shoulder, a bar fixed to one end of the shaft, a pin extending inwardly from the casing and adapted to have driving engagement with the bar, said casing having a recess in the outer wall thereof, and a spring pressed plunger adapted to be positioned in said recess to hold the casing in a definite position so that the pin will not engage the bar.

2. In a device of the class described, a shaft, a sleeve surrounding said shaft, a rotatable and axially shiftable casing surrounding the sleeve, means on the casing for drivingly engaging and rotating the shaft when the casing is in a predetermined position, spring means engaging the sleeve and the casing to normally hold the casing in a position whereby there will be no engagement between the casing and the shaft, and a spring pressed detent engaging the casing to hold the casing in the last mentioned position.

3. In a device of the class described, a shaft having a bar diametrically arranged in one end thereof, a rotatable and axially shiftable casing having a pin projecting inwardly therefrom and adapted to have driving engagement with said bar, a handle attached to said casing, resilient means for normally urging the casing so that the pin will not engage the bar, and a spring pressed detent adapted to engage the casing to hold the casing in the last mentioned position.

4. In a device of the class described, a sleeve having a flange, a rotatable and axially shiftable casing having a shoulder thereon and encircling said sleeve, a coiled compression spring encircling the sleeve and engaging the flange and shoulder, a shaft journalled in the sleeve, means on the casing adapted to have driving engagement with the shaft, said spring normally moving the casing to a position to prevent such engagement, said casing having a groove in the outer wall thereof, and a spring pressed plunger adapted to enter the groove and hold the casing in a position so that it will not engage the shaft.

5. In a device of the class described, a rotatable and axially shiftable casing, a handle attached to said casing, a sleeve positioned in the casing, a shaft journalled in said sleeve, a pin projecting inwardly from the casing and adapted to have driving engagement with said shaft, spring means interposed between the casing and sleeve to normally urge the casing to a position whereby the pin will not engage the shaft, and detent means to hold the casing in the last mentioned position.

DANIEL DOUGLAS DEMAREST.
CARL BERENDT.
WILLIAM KARIUS.